United States Patent [19]
Sakamoto et al.

[11] Patent Number: 6,008,311
[45] Date of Patent: Dec. 28, 1999

[54] AROMATIC POLYCARBODIIMIDE AND FILM THEREOF

[75] Inventors: Michie Sakamoto; Amane Mochizuki; Masahiro Yoshioka; Takahiro Fukuoka, all of Osaka, Japan

[73] Assignee: Nitto Denko Corporation, Osaka, Japan

[21] Appl. No.: 09/018,882

[22] Filed: Feb. 5, 1998

[30] Foreign Application Priority Data

Feb. 12, 1997 [JP] Japan ..................................... 9-044732
Feb. 12, 1997 [JP] Japan ..................................... 9-044733

[51] Int. Cl.[6] .......................... C08G 18/28; C07C 267/00
[52] U.S. Cl. ............................ 528/74; 524/195; 528/491; 525/907; 564/252
[58] Field of Search .............................. 528/74; 524/195; 525/907; 564/252

[56] References Cited

U.S. PATENT DOCUMENTS 4,111,914  9/1978  Kresta et al. ............................. 528/48
5,109,097  4/1992  Klun et al. ............................... 528/75

FOREIGN PATENT DOCUMENTS 0610960  8/1994  European Pat. Off. .
2292316  12/1990  Japan .

OTHER PUBLICATIONS

Lyman, Donald J. and Nasser Sadri. "Polycarbodiimides and their Deriviatives." *Die Makromolekulare Chemie*. 67, (1963) 1–9.

Greber, G. and H.R. Krichildorf. "A New Synthesis of Isocyanates and Isothiocyanates." *Angew. Chem. International Edition*. 7, (1968), 941.

Campbell, Tod W. and Kenneth C. Smeltz. "Carbodiimides. IV. High Polymers Containing the Carbodiimide Repeat Unit." *The Journal of Organic Chemistry*. 28, (1963), 2069–2075.

*Primary Examiner*—Tae Yoon
*Attorney, Agent, or Firm*—Sughrue, Mion, Zinn, Macpeak & Seas, PLLC

[57] ABSTRACT

A polycarbodiimide having excellent heat resistance and humidity resistance, which comprises a structural unit represented by the following formula (A)

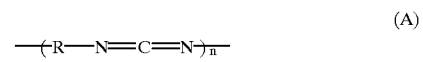

(A)

wherein R represents a divalent organic group represented by any one of the following formulae (I) and (II), n is an integer of 2 to 400

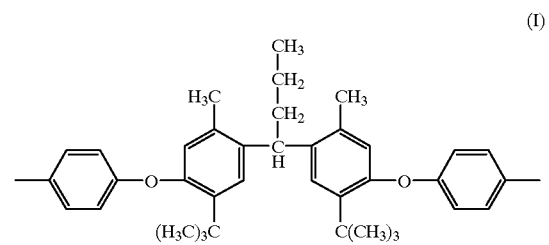

(I)

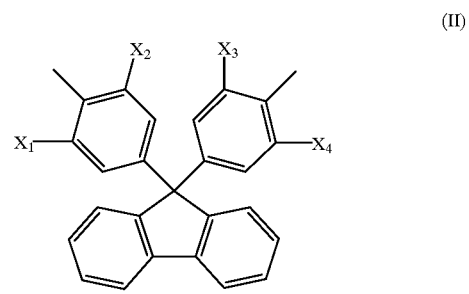

(II)

wherein $X_1$ to $X_4$ independently represent a hydrogen or an alkyl group having 1 to 3 carbon atoms.

4 Claims, 2 Drawing Sheets

AROMATIC POLYCARBODIIMIDE AND FILM THEREOF

FIELD OF THE INVENTION

The present invention relates to a novel aromatic polycarbodiimide. The aromatic polycarbodiimide of the present invention provides a film, an adhesive or a molded article, having various excellent properties, such as high heat resistance.

BACKGROUND OF THE INVENTION

Some aromatic polycarbodiimides have conventionally been obtained by polymerizing, for example, diphenylmethane diisocyanate (MDI) or tolylene diisocyanate (TDI) as a monomer. Such polycarbodiimides are used as a flame-retardant film or a heat-resistant adhesive because of its excellent heat resistance.

However, the polycarbodiimide obtained from TDI or MDI has a poor solubility and, therefore, may cause gelation or may become solid to be precipitated, with increasing the molecular weight. Thus, a sufficiently high molecular weight polymer cannot be obtained. Further, although the polycarbodiimide film has a heat-resistance in the point that a volatile gas or a decomposed monomer is not generated even if it is exposed to high temperature of 400° C. or more, if it is thermally treated at a temperature of 200° C. or more, it will lose a self-supporting property and become brittle. As a result, the film cannot be practically used. Furthermore, the film has a low moisture resistance at high temperature and under high pressure and also has an insufficient adhesive force when thermally contact-bonded with an adherend, such as a copper foil.

SUMMARY OF THE INVENTION

As a result of various investigations on various aromatic polymers in order to solve such disadvantages of the conventional polycarbodiimides, it has been found that the disadvantages can be overcome by a novel polymer according to the present invention.

Accordingly, an object of the present invention is to provide a novel aromatic polycarbodiimide which can provide various products having excellent properties.

The aromatic polycarbodiimide according to the present invention comprises a structural unit represented by the following formula (A):

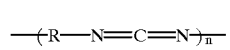

wherein R represents a divalent organic group represented by any one of the following formulae (I) and (II), n is an integer of 2 to 400;

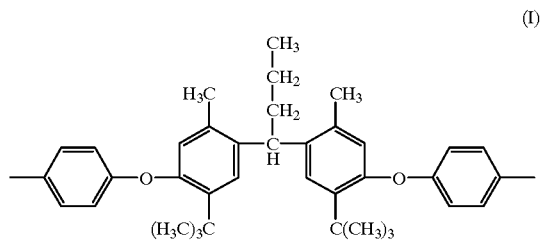

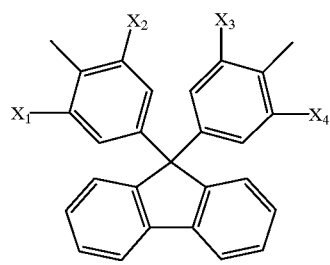

In the above formula (II), $X_1$ to $X_4$ independently represent hydrogen atom or an alkyl group having 1 to 3 carbon atoms.

Regarding an embodiment wherein R in the above-described formula (A) is represented by the formula (II), U.S. Pat. No. 5,109,097, is disclosed an aromatic diisocyanate represented by the following formula (III)

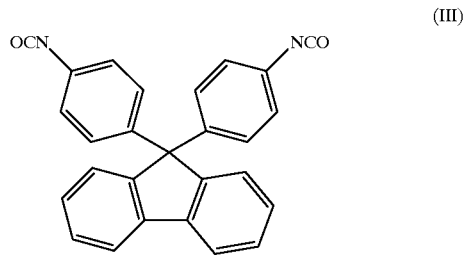

However, it is not described at all in the U.S. patent that the aromatic diisocyanate compound is polymerized and polycarbodiimide can be obtained therefrom.

DETAILED DESCRIPTION OF THE INVENTION

Figure 1:
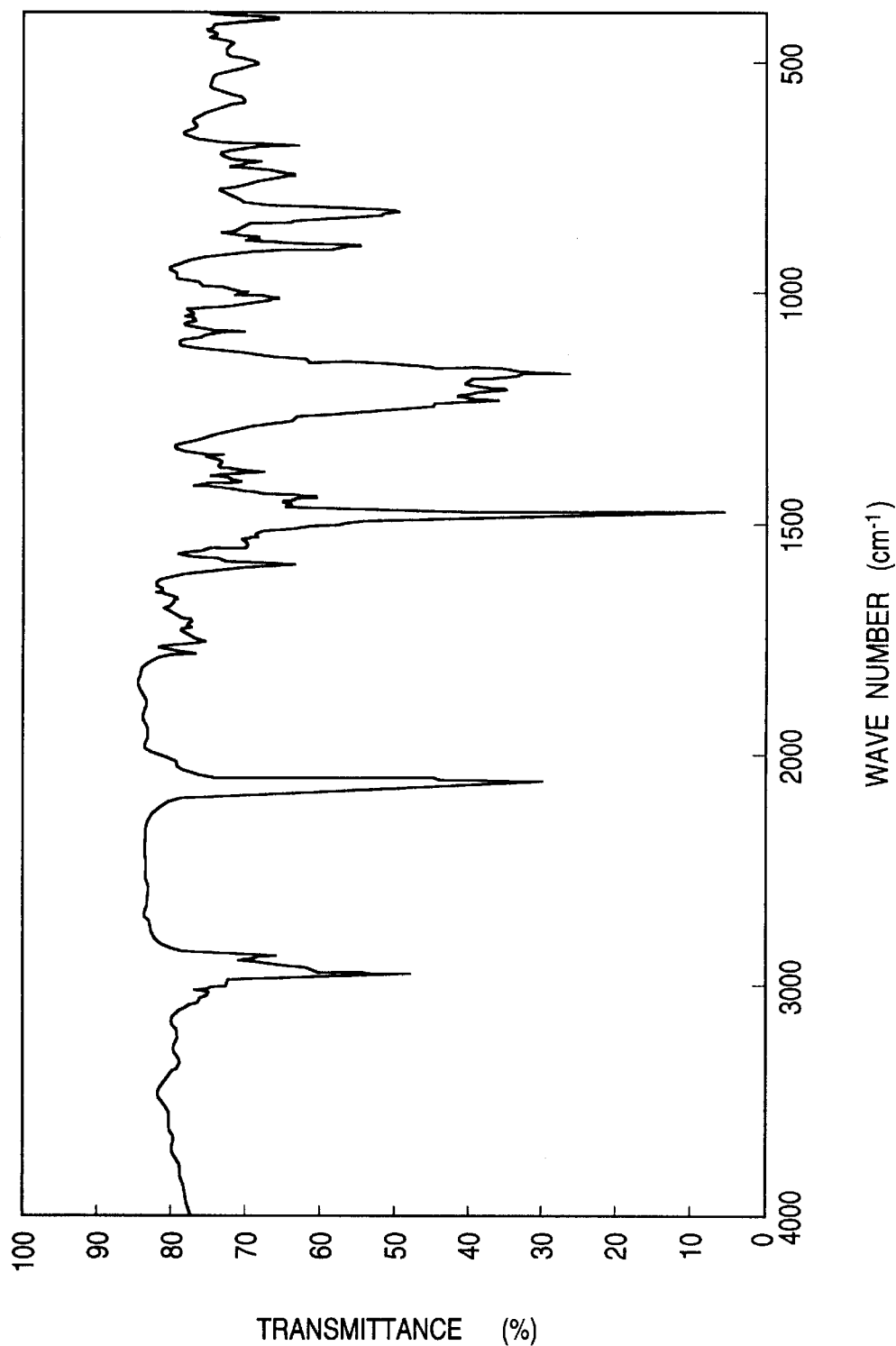
FIG. 1 is a graph showing an infrared absorption spectrum of the polymer obtained in Example 1.

The polymer according to the present invention is represented by the formula (A) wherein n is an integer of 2 to 400. This novel polymer has an excellent solubility and also a considerably high heat resistance. Further, the polymer has excellent adhesive properties, low temperature workability and moisture resistance. The polycarbodiimide according to the present invention is obtained by polymerizing the diisocyanate corresponding to the following formulae (IV) and (V) as a monomer in the presence of a phosphorus catalyst by conventional process.

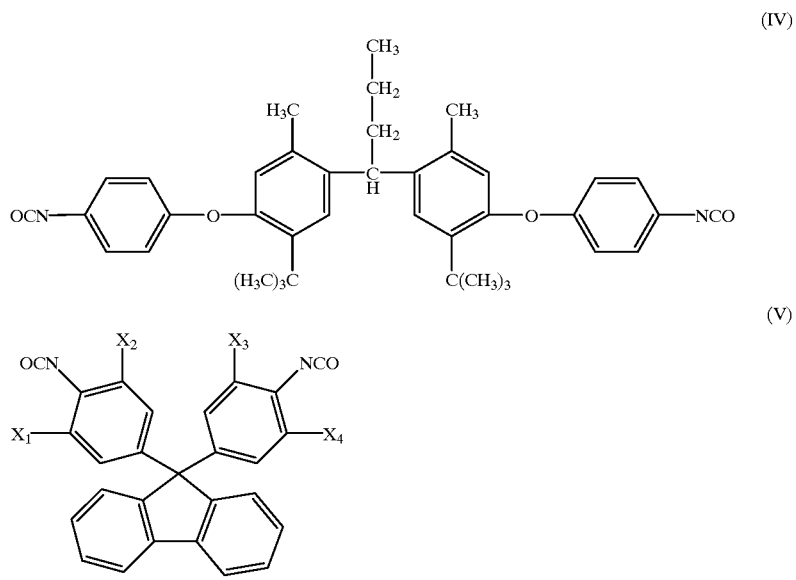

wherein $X_1$ to $X_4$ independently represent hydrogen atom or an alkyl group having 1 to 3 carbon atoms.

Only the above-described monomer may be used as a monomer used for the polymerization. However, other organic diisocyanates (e.g., 4,4'-diphenylmethane diisocyanate, 2,6-tolylene diisocyanate, 2,4-tolylene diisocyanate, 1-methoxyphenyl-2,4-diisocyanate, 3,3'-dimethoxy-4,4'-diphenylmethane diisocyanate, 4,4'-diphenylether diisocyanate, 3,3'-dimethyl-4,4'-diphenylether diisocyanate, o-tolylene diisocyanate) can be copolymerized in an amount such that the properties of the above-described monomer are not impaired (about 30% by weight or less).

Reaction temperature in the polymerization is preferably 40 to 150° C., and more preferably 50 to 140° C. When the reaction temperature is less than 40° C., the reaction time is too prolonged. Thus, such a temperature is not practical. If the temperature exceeds 150° C., it is difficult to select an appropriate solvent.

Concentration of an isocyanate monomer in the synthesis of a polycarbodiimide is 2 to 70% by weight (hereinafter simply referred to as "%"), preferably 5 to 60%, and more preferably 15 to 50%. If the concentration is less than 2%, carbodiimidation may not proceed. On the other hand, if the concentration exceeds 70%, there is the possibility that it is difficult to control the reaction.

The organic solvent used in the synthesis of a polycarbodiimide and in preparing a polycarbodiimide solution may be conventional organic solvents. Examples of the organic solvent include halogenated hydrocarbons, such as tetrachloroethane, 1,2-dichloroethane or chloroform; ketone solvents, such as acetone, methylethylketone, methylisobutylketone or cyclohexanone; ether solvents, such as tetrahydrofuran and dioxane; and aromatic hydrocarbon solvents, such as toluene, xylene or benzene. Those can be used alone or as mixtures thereof.

Catalyst which can be used in carbodiimidation is phosphorene oxides (e.g., 1-phenyl-2-phosphorene-1-oxide, 3-methyl-2-phosphorene-1-oxide, 1-ethyl-2-phosphorene-1-oxide, 3-methyl-1-phosphorene-1-oxide, or 3-phosphorene isomers thereof).

In any one of the end stage, middle stage or initial stage of a polymerization reaction, or throughout the reaction, monoisocyanate may be added to the reaction system to perform an end-capping treatment. Such a monoisocyanate which can be used is aromatic monoisocyanates such as phenyl isocyanate, p-nitrophenyl isocyanate, p- or m-tolyl isocyanate or p-formylphenyl isocyanate. The polycarbodiimide solution thus obtained has excellent storage stability.

After completion of the reaction, the reaction mixture may be poured into a poor solvent, such as methanol, ethanol or hexane, to precipitate a polycarbodiimide powder, thereby removing unreacted monomer or a catalyst. By conducting such an operation, the stability of the polycarbodiimide solution can be further improved. After precipitating the polycarbodiimide as a polymer powder, washing and drying thereof are effected according to a predetermined procedure, and the resulting polycarbodiimide is then dissolved again in an organic solvent. Thus, a polycarbodiimide solution can be obtained.

By-products contained in the polymer solution may be adsorbed on an appropriate adsorbent to purify the solution. Examples of the adsorbent which can be used are alumina gel, silica gel, activated carbon, zeolite, activated magnesium oxide, activated bauxite, Fuller's earth, activated clay, molecular sieve carbon, and the like. Those can be used alone or in any combination thereof.

The molecular weight of the polycarbodiimide of the present invention is 1,000 to 200,000, and preferably 4,000 to 100,000, in terms of a number average molecular weight where R in the formula (A) is represented by the formula (I). Namely, in the formula (A), n is an integer of 2 to 400, and preferably 7 to 200. Further, the molecular weight of the polycarbodiimide of the present invention is 1,000 to 100,000, and preferably 4,000 to 20,000, in terms of a number average molecular weight where R in the formula (A) is represented by the formula (II). Namely, in the formula (A), n is an integer of 2 to 280, and preferably 10 to 60.

If the molecular weight of the polycarbodiimide is too large, gelation may readily occur within several minutes to several hours even if it is allowed to stand at an ordinary temperature. This phenomenon is not desirable in the practical use. On the other hand, if the molecular weight is too small, the resulting film undesirably lacks reliability.

[Production of Film and Adhesive Sheet]

A polycarbodiimide film (or sheet) of the present invention can be produced by forming a polycarbodiimide varnish into a film according to a conventional method (e.g., casting, spin coating, or roll coating). This film is desirably dried at a temperature which is usually required to remove a solvent and does not advance a hardening reaction considerably. The drying temperature is 30 to 350° C., and preferably 50 to 250° C. If the drying temperature is too low, a solvent remains in a resulting film to undesirably decrease the reliability of the film. On the other hand, if the drying temperature is too high, crosslinking of the polycarbodiimide resin may advance to undesirably cause rupture or poor stretching in stretching the film.

A polycarbodiimide composition of the present invention can be compounded with fine inorganic fillers in an amount which does not impair workability and heat resistance thereof. Further, in order to provide a surface smoothness, various additives such as a smoothing agent, a leveling agent, a deformer may be added depending upon a necessity.

A molded article obtained by molding the polymer of the present invention in the form of a film can be used as a heat-resistant adhesive sheet. Thickness of the sheet which can be molded into a film or an adhesive sheet is generally 1 to 200 $\mu$m. However, the thickness is not limited thereto and can be optionally selected depending upon an object for use. A shape or a size of the sheet can also be optionally selected depending upon an adherend, such as a lead frame or a semiconductor chip.

In producing an adhesive sheet, in order to impart conductivity, improve heat transfer property, control elasticity modulus, and especially attain a high elasticity, for example, metals (e.g., aluminum, copper, silver, gold, nickel, chromium, lead, tin, zinc, palladium, or solder), or alloys thereof, ceramics (e.g., alumina, silica, magnesia, or silicon nitride), and other various inorganic powders comprising carbon can be compounded alone or as mixtures thereof.

Alternatively, the film can be formed on a support to form an adhesive sheet. In order to produce the adhesive sheet having such a construction, a varnish may be coated on the support. Alternatively, the film is previously formed, and is then laminated on the support by means of a press.

The support which can be used is a metal foil and an insulating film. Examples of the metal foil are metals (e.g., aluminum, copper, silver, gold, nickel, chromium, lead, tin, zinc, or palladium), and alloys thereof. Examples of the insulating film are heat-resistant or chemical-resistant films, such as polyimide, polyester or polyethylene terephthalate.

The metal foil and the insulating film can be used alone or as a two or more layered product, for example, a two layered substrate of a metal foil/insulating film laminate. The two layered substrate is, for example, copper/polyimide two layered substrate.

A sheet-like adhesive of the present invention is thermally cured by a thermal treatment to develop a strong adhesion and also form a cured product having a low hygroscopicity. In order to conduct the heat treatment, an optional method, for example, a heater, ultrasonic waves or ultraviolet rays, can be used. Accordingly, the adhesive sheet of the present invention is desirable for adhesion treatment of various materials. Particularly, it is desirable for sealing treatment of electric and electronic parts represented by a semiconductor chip and a lead frame, which are required to have a low hygroscopicity. The adhesive sheet of the present invention is excellent in the following points: it is low hygroscopic, it is highly flexible so that it can be readily handled, it has a good adhesion to a semiconductor element, and it has a desirable storage stability. Further, a metal foil having an adhesive applied thereon produced by coating a varnish of a resin composition of the present invention on one surface thereof, followed by drying is particularly useful for the production of a multilayered circuit board.

A stretched film of the polycarbodiimide according to the present invention can have various shapes, such as a sheet or a tube. For example, a stretched film can be obtained by stretching the film obtained by the above-described method in one direction (main axial direction) at 1.2 to 10 times, and preferably 2 to 6 times. If desired, stretching further can be effected in the direction perpendicular to the above-described stretching direction (main axial direction) at 1 to 5 times, and preferably 1.1 to 1.6 times. The order of the above-described stretching is optional. By stretching in the direction perpendicular to the main axial direction as described above, the impact property of the stretched film is improved and the property of readily tearing in one direction is relaxed. If the stretching in the direction perpendicular to the above-described stretching direction (main axial direction) exceeds 5 times, the heat shrinkage in the direction perpendicular to the main axial direction becomes too large so that the finished appearance to which a heat shrinking treatment is applied is in waves. Thus, the appearance becomes undesirably ununiform.

Stretching temperature is preferably 40 to 200° C. so as to be dried before a curing reaction of a polycarbodiimide resin proceeds to a considerable extent. If the stretching temperature is less than 40° C., a sufficient stretch ratio cannot be obtained and the resulting film tends to break. On the other hand, if it exceeds 200° C., a curing reaction of the polycarbodiimide resin partially proceeds and, therefore, the heat recovery property thereof tends to be decrease.

The stretching method is not particularly limited. For example, any conventional methods, such as a roll stretching method, a long gap stretching method, a tenter stretching method or a tubular stretching method, can be employed.

[Object for Use]

The polycarbodiimide film thus produced can be used as heat-resistant insulating materials and adhesive films of electric and electronic parts. Further, films which have been subjected to a stretching treatment are used as, for example, heat-resistant coating materials of various products. In coating a product with a stretched film, an adherend to be protected (product) is coated with a heat-shrinkable film made of a molding material comprising polycarbodiimide resin as a main component, and the coated product is then heat treated to cure the film. The curing reaction of the polycarbodiimide proceeds by this heat treatment, so that the polycarbodiimide resin flows into concave and convex portions formed on the surface of the adherend to produce anchor effects, and, at the same time, a chemical reaction between polar groups on the surface of the adherend and cumulative multiple bonds of the polycarbodiimide resin occurs. Thus, chemical and physical adhesion can be achieved.

The adherend is not particularly limited, and examples thereof are glass, metals, resins, ceramic sheets or plates, and ring-shaped products. Specific products thereof are electrical wires of power cables, glass bottles and electronic parts.

[Monomer]

An isocyanate compound represented by the formula (IV), i.e., diisocyanate monomer which is a starting material of the aromatic polycarbodiimide of the present invention, is a novel aromatic diisocyanate. The production method thereof will be explained below.

This diisocyanate can be produced by isocyanating an amino precursor of the diisocyanate compound by a conventional method. Conventional diamine compound represented by the following formula (VI) can be used as the precursor.

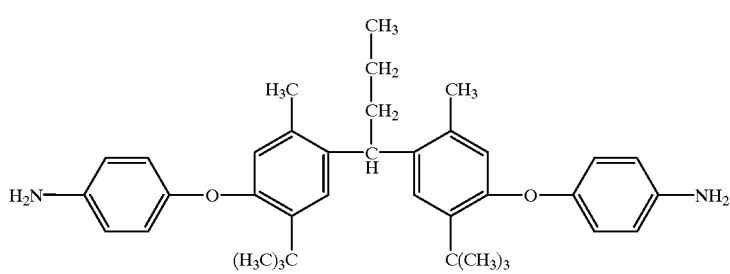

(VI)

A method for isocyanating such a diamine compound is a method of reacting phosgene, diphenyl carbonate or carbonyl diimidazole. Alternatively, a diamine compound is converted to an urethane intermediate using a halogenated formate, and the urethane intermediate is then isocyanated in the presence of a catalyst, such as chlorosilane or catechol borane. Still another method which can be employed is a method of using a dicarboxylic acid represented by the following formula (VII) as a precursor of a diisocyanate, and isocyanating the same by Curtius decomposition. It should be noted that in view of ease in obtaining a starting material, a diamine is preferably used.

dioxane or diethyl ether), aromatic hydrocarbon compounds (e.g., toluene, xylene or benzene), ketone compounds (e.g., acetone or methylethylketone), and ester compounds (e.g., ethyl acetate). Those solvents can be used alone or as mixtures thereof.

The reaction temperature is −40 to 100° C., preferably −20 to 80° C., and most preferably 0 to 60° C. If the reaction temperature is less than −40° C., the reaction is difficult to proceed. On the other hand, if the temperature exceeds 100° C., a side reaction such as condensation may occur.

A base for trapping hydrogen chloride generated by the reaction can be any so long as they can dissolve in a solvent

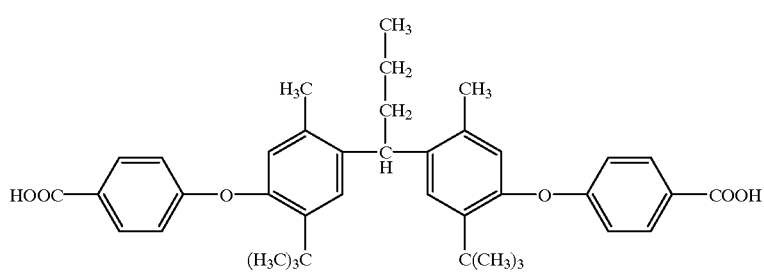

(VII)

Of those production methods, a method wherein a diamine compound is converted to an urethane intermediate with a halogenated formate, and the intermediate is then isocyanated in the presence of chlorosilane as a catalyst (G. Greber, et al., Angew. Chem. Int. Ed. Vol. 17, No.12, 941 (1968)) or a method of using catechol boran as a catalyst (V. L. K. Valli. et al., J. Org. Chem, Vol. 60, 257 (1995)) are preferable from the standpoints of yield and safety. Those methods will be described hereinafter.

9,9-Bis(4-isocyanatophenyl)fluorene represented by the formula (V) which is the starting material of the polycarbodiimide of the present invention can be synthesized by isocyanating the amino precursor thereof, i.e., 9,9-bis(4-aminophenyl)fluorene by various conventional methods.

[Synthesis of Urethane Intermediate]

An urethane intermediate is synthesized by reacting a halogenated alkyl formate, such as methylchloroformate, ethylchloroformate, phenylchloroformate or p-nitrophenylchloroformate, with a corresponding diamine compound. Of those halogenated formates, in order to proceed the isocyanation smoothly, phenylchloroformate or p-nitrophenylchloroformate is preferable. However, since p-nitrophenylchloroformate is highly active and has a possibility of causing a side reaction, phenylchloroformate is most preferable.

A solvent used in the reaction can be any solvents so long as a diamine can be dissolved therein. Examples of the solvent are ether compounds (e.g., tetrahydrofuran (THF), used and do not inhibit the reaction. Examples of the base used are triethylamine, pyridine, sodium hydroxide and diazabicycloundecene (DBU). Such a base should be used in an amount of 1.5 to 4.0 moles, and preferably 1.8 to 3.5 moles, per mole of the diamine used.

The resulting urethane intermediate can be purified by a conventional method, such as recrystallization or a column chromatography. Further, distillation may be conducted if necessary.

(a) Isocyanation with Chlorosilane

In order to convert the urethane intermediate to an isocyanate, thermal decomposition of the urethane is conducted using a chlorosilane in an amount of 1.5 to 4.6 moles, and preferably 1.8 to 3.5 moles, per mole of the urethane, as a catalyst. Examples of the chlorosilanes include trimethylchlorosilane, triethylchlorosilane, trimethoxychlorosilane and tetrachlorosilane. From the standpoint of ease in handling and cost, trimethylchlorosilane is preferable.

The solvent can be any solvents so long as they can dissolve or suspend an urethane. Examples of the solvent include halogenated hydrocarbon compounds, such as dichloromethane, chloroform, dichloroethane or tetrachloroethane, in addition to the above-described ether compounds, aromatic hydrocarbon compounds, ketone compounds and ester compounds.

Those solvents can be used alone or as mixtures thereof. Optionally, a part or all of the solvents can be replaced in the course of the reaction, thereby changing a reaction temperature.

The reaction temperature is from 0° C. to the boiling point of a solvent used, and preferably from room temperature to the boiling point. If the reaction temperature is too low, the reaction may not proceed at all. On the other hand, If the reaction temperature is too high or heating is applied too long, the resulting product may sometimes decompose. Therefore, it is desirable to proceed the reaction with gradually raising a temperature while tracing the reaction by IR.

In order to trap hydrogen chloride generated in the reaction, a base, such as triethylamine, can be used as in the above.

(b) Isocyanation using Halogenated Catecholborane

For isocyanation of the urethane intermediate, a method can be used wherein instead of the above-described chlorosilane, halogenated catecholborane is used as a catalyst. The halogenated catecholborane which can be used includes chlorocatecholborane and bromocatecholborane. However, from the standpoint of cost and ease in handling, chlorocatecholborane is preferable. It should be noted that since catecholboranes have an activity to thermal decomposition higher than that of chlorosilanes, urethanes other than phenyl urethane can also be used as the urethane to be used in the present invention.

A solvent used in the reaction can be the same solvents as used in the above-described isocyanation using chlorosilane.

The reaction temperature is generally −50 to 80° C., preferably 20 to 60° C., and more preferably 0 to 40° C., when phenyl urethane is used. It is better to change the reaction temperature depending upon a kind of the urethane used. If the reaction temperature is fallen outside the range or an excessive heating is applied, a reaction may not proceed or a product may decompose as described in (a) above. Therefore, it is desirable to proceed the reaction with gradually raising a temperature while tracing the reaction by IR.

A base used for trapping hydrogen chloride generated in the reaction can be the same bases as described above.

After completion of the reaction, the solvent is removed, and the isocyanate monomer thus obtained can be purified with a flash column, recrystallization or distillation under reduced pressure.

The above-described urethanation, isocyanation and carbodiimidation of a diamine can be proceeded stepwise by conducting isolation and purification in respective steps. Alternatively, these steps are continuously conducted in one reaction vessel as a series of reaction.

The present invention will be described in more detail by reference to the following Examples, but it should be understood that the invention is not construed as being limited thereto. Properties of the resulting polycarbodiimide were measured as follows.

IR

Measured using FT/IR-230 (manufactured by Nippon Denshi K.K.).

Heat Curing Temperature

Measured using DSC-200(manufactured by Seiko Denshi Kogyo K.K.). Exothermic peak of a trimer was determined as a heat curing temperature.

Glass Transition Temperature (Tg)

Measured using SEIKO SSC/560M (manufactured by Seiko Denshi Kogyo K.K.) while raising a temperature from room temperature to 400° C. at a rate of 10° C./min.

Thermal Decomposition Initiation Temperature (Td)

Measured using TG/DTA300 (manufactured by Seiko Denshi Kogyo K.K.). 5% weight loss temperature was determined as Td.

Number Average Molecular Weight

Measured using HLC8120 (manufactured by Toso K.K.) as an apparatus, and $GMH_{HR}$-H+$GHR_{HR}$-H+$G200H_{HR}$ (manufactured by Toso K.K.) as a column.

Adhesive Force

180° peeling strength was determined using Shimazu autograph AGS-100D (manufactured by Shimazu Seisakusho K.K.).

EXAMPLE 1

2 g (3.5 mmol) of 1,1-bis[2'-methyl-4'-(p-aminophenoxy)-5'-tert-butylphenyl]butane, 20 ml of dichloromethane, and 0.72 g (7.1 mmol) of triethylamine were charged into a 50 ml eggplant-shape flask. The flask was ice-cooled, and 1.1 g (7.1 mmol) of phenychloroformate was charged thereto. The resulting mixture was stirred as it is for several minutes, and then stirred at room temperature overnight. 0.65 g (6.4 mmol) of triethylamine and 0.69 g (6.4 mmol) of trimethylchlorosilane were successively charged into the flask at room temperature, and the resulting mixture was stirred for 5 minutes, and then further stirred at 50° C. for 30 minutes.

61 mg (0.32 mmol) of carbodiimidation catalyst (3-methyl-1-phenyl-2-phosphorene-1-oxide) was dissolved in 20 ml of toluene. The resulting mixture was charged into the flask and stirred at 60° C. for 1.5 hours. Stirring was further continued for 5.5 hours, while raising a temperature to 100° C. During the stirring, dichloromethane was distilled off. Carbodiimidation was confirmed by IR absorption spectrum (see FIG. 1), and thereafter, triethylamine hydrochloride was filtered off to obtain a polycarbodiimide having a number average molecular weight of Mn=6,000 (yield 70%).

This polymer was coated on a glass plate, followed by drying at 200° C. for 10 minutes, thereby obtaining a film. This film had flexibility, heat curing temperature of 375° C., Tg=172° C. and Td=351° C. Even after drying at 200° C. for 60 minutes, this film still had flexibility.

EXAMPLE 2

Varnish prepared by dissolving the polycarbodiimide obtained in Example 1 in tetrahydrofuran (THF) so as to have the polycarbodiimide concentration of 40% by weight was coated on a copper foil (thickness 35 μm), and dried at 200° C. for 10 minutes to obtain an adhesive sheet having a thickness of 20 μm. The adhesive sheet thus obtained was adhered on 42 alloy (Ni—Fe alloy) plate and bonded each other by pressing at 350° C. under a pressure of 50 kg/cm² for 1 second. The measurement of the adhesive force showed 980 g/cm. This adhered product was placed in a 80° C./90% RH constant temperature humidistat and maintained therein for 168 hours. Thereafter, the adhesive force was measured, and showed 810 g/cm.

Comparative Example 1

Example 1 was followed except for using tolylene diisocyanate (TDI) as an isocyanate monomer to obtain a polycarbodiimide having Mn=9,600. Varnish prepared by dissolving the polycarbodiimide thus obtained in THF so as to have the polycarbodiimide concentration of 40% by weight was coated on a glass plate, and dried at 90° C. for 30 minutes to obtain a film having Tg of 78° C. This film had a heat curing temperature of 350° C. When the film was heat treated at 200° C. for 1 hour, the film discolored and lost flexibility, resulting in losing self-supporting property.

This varnish was treated in the same manner as in Example 2 to prepare an adhesive sheet, and the adhesive sheet was adhered to 42 alloy plate. As a result of measurement of the adhesive force, it showed 600 g/cm. This adhered product was placed in a 80° C./90% RH constant temperature humidistat and maintained therein for 168 hours. As a result, adhesive sheet was peeled off from the 42 alloy plate.

EXAMPLE 3

10.0 g (28.7 mmol) of 9,9-bis(4-aminophenyl)fluorene, 240 ml of dichloromethane and 5.80 g (57.4 mmol) of triethylamine were charged into a 300 ml three-necked flask. 8.98 g (57.4 mmol) of phenylchloroformate was introduced into a dropping funnel, and a reaction vessel was cooled to 0° C. in an ice bath. The phenylchloroformate was added to the reaction vessel in several seconds, and then stirred overnight while returning the temperature to room temperature.

Figure 2:
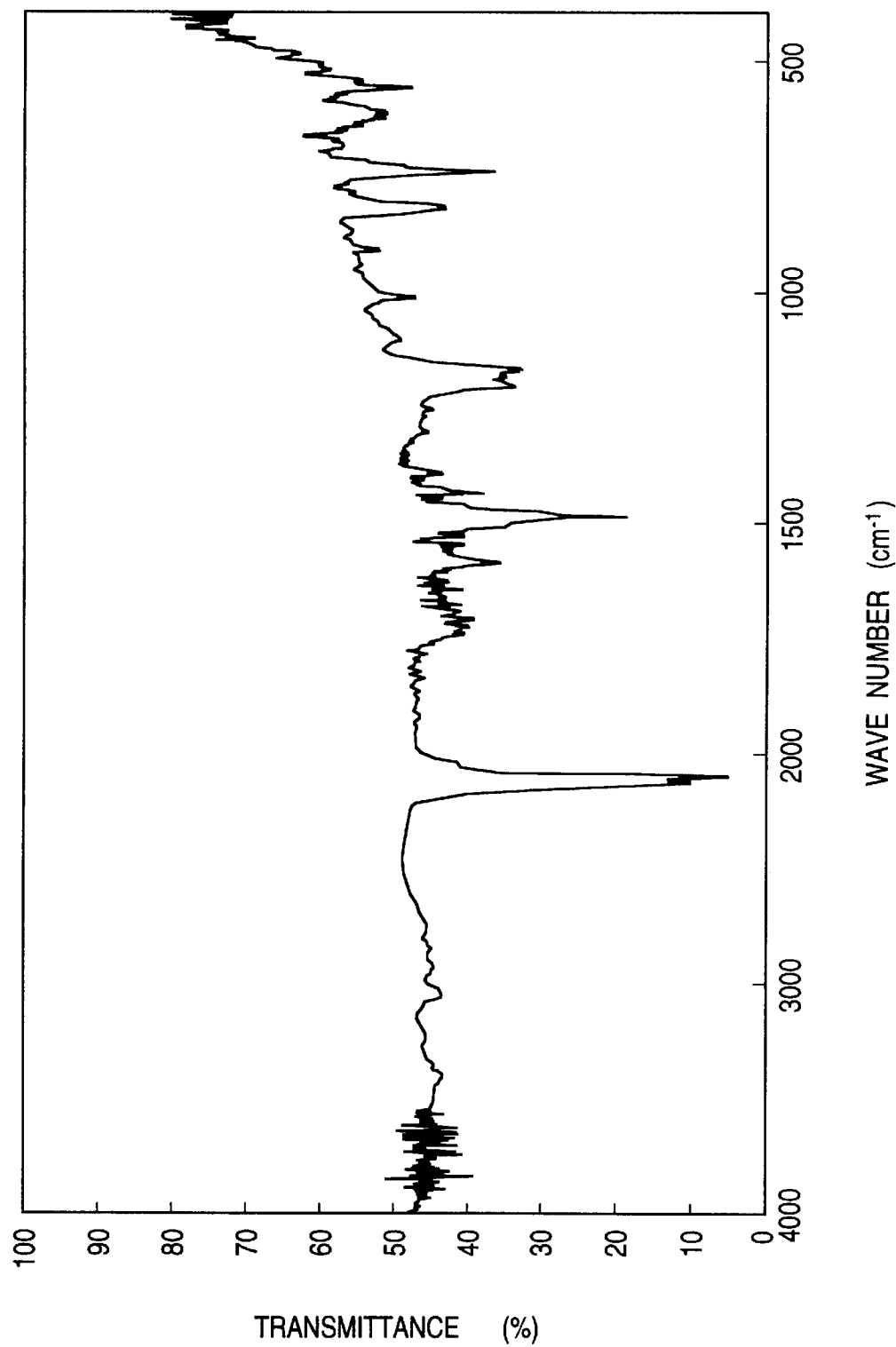
FIG. 2 is a graph showing an infrared absorption spectrum of the polymer obtained in Example 3.

7.53 g (74.6 mmol) of triethylamine and 8.09 g (74.6 mmol) of trimethylchlorosilane were successively charged in the flask, and the resulting mixture was refluxed therein for 2 hours. 100 ml of THF and 0.441 g (2.30 mmol) of a carbodiimidation catalyst (3-methyl-1-phenyl-2-phosphorene-1-oxide) were added thereto, and stirring was conducted at 55° C. for 2 hours, while distilling off dichloromethane, followed by refluxing for 5 hours. A salt formed was removed by filtration. Further, reprecipitation was conducted using 1.75 liters of n-hexane. The resulting precipitate was dried at 30° C. for 8 hours under reduced pressure to obtain 7.00 g (19.7 mmol, yield 69%) of white powdery polycarbodiimide. The polycarbodiimide had Mn=2,800. Carbodiimidation was confirmed by IR absorption spectrum (see FIG. 2).

The white powder obtained above was soluble in organic solvents, such as THF, cyclohexanone or chloroform. Varnish prepared by dissolving 0.6 g of this white powder in 1.8 g of cyclohexanone was coated on a glass plate, followed by drying at 200° C. for 20 minutes, thereby obtaining a film. This film had flexibility even after drying at 250° C. for 20 minutes and at 300° C. for 20 minutes. Properties of the resulting film were measured. As a result, heat curing temperature was 390° C., Td=505° C. and Tg=185° C.

Comparative Example 2

110 g (40 mmol) of diphenylmethane diisocyanate (MDI) was reacted in the presence of 60 mg (0.31 mmol) of the carbodiimidation catalyst (3-methyl-1-phenyl-2-phosphorene-1-oxide) in THF 50 ml at 60° C. for 2 hours. The resulting reaction solution was casted on a glass plate to form a film.

This film had a heat curing temperature of 350° C. When the film was heat treated at 250° C. for 1 hour, it was colored and lost flexibility, thereby losing the self-supporting property. White powdery polycarbodiimide obtained by reprecipitating the above reaction solution was not soluble in organic solvents, such as cyclohexanone, toluene or acetone.

The polycarbodiimide according to the present invention is readily soluble in common organic solvents and also can be readily molded and processed. Further, since it has a glass transition temperature of about 200° C., a low temperature processing can be readily effected. The film thereof has a good adhesion to an adherend such as a semiconductor element, has a low moisture absorption, has an excellent storage stability, and can be preserved for a long period of time at an ordinary temperature. Further, by curing this film by a heat treatment, the film shows excellent heat resistance and humidity resistance and, therefore, can be used as a heat-resistant coating material in soldering process in the production of electronic parts.

While the invention has been described in detail and with reference to specific embodiments thereof, it will be apparent to one skilled in the art that various changes and modification can be made therein without departing from the spirit and scope thereof.

What is claimed is:

1. An aromatic polycarbodiimide comprising a structural unit represented by the following formula (A)

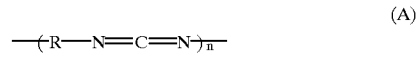

(A)

wherein R represents a divalent organic group represented by the following formula (I), and n is an integer of 2 to 400,

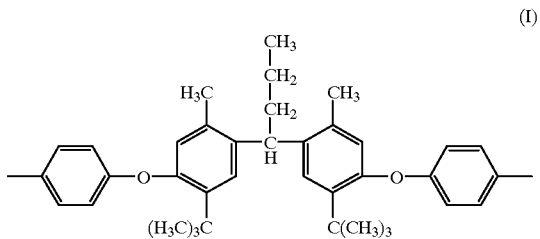

(I)

2. A polycarbodiimide solution comprising an aromatic polycarbodiimide dissolved in an organic solvent, wherein the aromatic polycarbodiimide comprises a structural unit represented by the following formula (A)

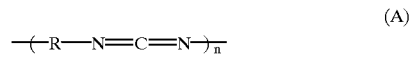

(A)

wherein R represents a divalent organic group represented by the following formula (I), and n is an integer of 2 to 200:

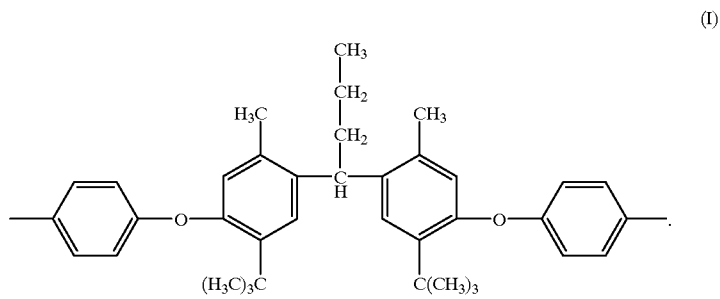

(I)

3. A polycarbodiimide film comprising an aromatic polycarbodiimide comprising a structural unit represented by the following formula (A)
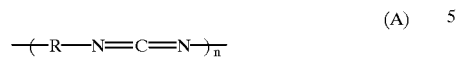
(A)
wherein R represents a divalent organic group represented by the following formula (I), and n is an integer of 2 to 200:
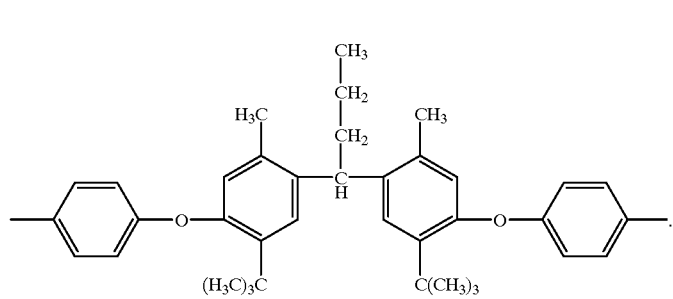
(I)
4. The polycarbodiimide film as claimed in claim 3, which is stretched to at least monoaxial direction.
* * * * *